US007523213B1

(12) United States Patent
Shen et al.

(10) Patent No.: US 7,523,213 B1
(45) Date of Patent: Apr. 21, 2009

(54) EFFICIENT APPROACH WITH THE TOLERATION OF STALE DATA TO DYNAMICALLY TRANSFORM AND UNIFY DATA QUALITY IN CLIENT AND SERVER WITH CONTINUOUS TRANSACTION FLOWS

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/124,108

(22) Filed: May 20, 2008

(51) Int. Cl.
*G06F 15/16* (2006.01)
(52) U.S. Cl. .................. 709/230; 709/203; 709/224; 707/204
(58) Field of Classification Search ......... 709/200–203, 709/217–230; 707/100, 204
See application file for complete search history.

(56) References Cited

U.S. PATENT DOCUMENTS

| 5,475,813 | A | 12/1995 | Cieslak et al. |
| 6,256,634 | B1 * | 7/2001 | Moshaiov et al. ......... 707/100 |
| 6,453,326 | B1 * | 9/2002 | Parham et al. ............ 707/204 |
| 6,654,771 | B1 * | 11/2003 | Parham et al. ............ 707/204 |
| 7,383,264 | B2 * | 6/2008 | Sutoh et al. .............. 707/10 |
| 2003/0191857 | A1 | 10/2003 | Terrell et al. |
| 2004/0193625 | A1 * | 9/2004 | Sutoh et al. .............. 707/100 |
| 2004/0267758 | A1 * | 12/2004 | Katsurashima ............ 707/10 |
| 2005/0108289 | A1 * | 5/2005 | East et al. ................ 707/200 |
| 2007/0067296 | A1 | 3/2007 | Malloy et al. |
| 2007/0118577 | A1 * | 5/2007 | East ....................... 707/204 |
| 2007/0260676 | A1 | 11/2007 | Bozinovski et al. |

* cited by examiner

*Primary Examiner*—Moustafa M Meky
(74) *Attorney, Agent, or Firm*—King & Spalding LLP

(57) ABSTRACT

Discrepancies between client replication data quality information and server replication data quality information may be addressed by recording and transmitting the transaction processing rate for the server. The transaction processing rate may be used in conjunction with the number of transactions the server is behind to determine the transaction delay. The transaction delay may also be used in conjunction with the transaction processing rate to calculate the transaction lag. Using this information, the client and server may have a similar understanding of the replication data quality. This information may be cached and used to determine what servers requests should be routed to. Each time a client makes a request, the transaction processing rate and/or the transaction lag for the given server may be inserted into the replication data stream. The values inserted into the replication data stream may invalidate and replace the cached values.

1 Claim, 1 Drawing Sheet

EFFICIENT APPROACH WITH THE TOLERATION OF STALE DATA TO DYNAMICALLY TRANSFORM AND UNIFY DATA QUALITY IN CLIENT AND SERVER WITH CONTINUOUS TRANSACTION FLOWS

BACKGROUND OF THE INVENTION

FIELD OF THE INVENTION

The invention relates to a method for increasing the consistency between client replication data quality information and server replication data quality information.

DESCRIPTION OF BACKGROUND

In the financial and trading and banking business, as well as media like Bloomberg®, CNBC®, and others, clients use time delay as a metric for replication data quality, where a delay of seconds is higher replication data quality than a delay of minutes. On the server side, the number of transactions behind represents replication data quality because transaction flow dictates the quality of the data. The fewer transactions behind, the higher the replication data quality. At any given time there could be a great number of transactions per second that require replication, for example 50,000 transactions per second, or very few transactions to replicate, for example 10 transactions per second. For a highly demanded stock like IBM®, transaction flow may be high, for example 10,000 transactions per second, whereas transaction flow for other stocks may be as low as, for example, 10 transactions per day. During peak hours, thousands of transactions may take place every minute. During off-peak hours, there may not be any transactions, for example, during the night.

In addition to media websites such as Bloomberg® and CNBC®, trading company websites such as E*Trade®, NYSE® and Fidelity® all use replicated data to accommodate a large number of clients. The replication process requires the transfer of transaction logs from the master server into various replica servers, and applies those transactions to the replica servers at different rates depending on the network, geographical distance, and the transaction rate. Accordingly, some replica servers get more data at a greater rate than other servers.

Under server snapshot replication, the server periodically takes a snapshot of the data and replicates this snapshot to other servers at some pre-defined interval. This differs from data backup because the snapshot replicas are for client access. Banks, for example, traditionally take a snapshot of the server once every 24 hours. One media traditionally took a snapshot of all headlines every 30 minutes and a stock price snapshot every 5 minutes. Snapshot replication, however, has many drawbacks that have driven most enterprises away from this replication method. The periodic nature of snapshot replication makes inefficient use of network and machines resources and causes uneven, oscillating server utilization by overloading the network and the machine during taking the snapshot while leaving the network and machine idle at other times. Snapshots also have a lower replication data quality and are less current than continuously replicated data.

Continuous replication, which has replaced snapshot replication in many applications because it better utilizes machine and network resources and provides better quality of data with less delay, continuously wires transaction logs to replicated servers, fully using network and machine capacity. Transactions may accumulate on one or more servers in the network, but once network and machine capacity allows, these accumulated transaction logs will be transferred and applied to replicated servers. Continuous replication, however, makes it difficult to measure server data quality because it does not have the periodic qualities of snapshot replication anymore; instead, server data quality changes every second as replication progresses and as network and machine capacities allow. Accordingly, there exists a large gap between clients' understanding and use of replication data quality information and the server's perspective on the replication data quality that continuous replication provides.

SUMMARY OF THE INVENTION

The present invention addresses the discrepancy between client replication data quality information and server replication data quality information by recording and transmitting the number of transactions the server is processing each second. This information may be cached and used to convert the delay into how many transactions lag the continuous replication. The present invention avoids calculation problems due to stale transactions per second data by, for example, recalculating the number of transactions the server is processing each second each time a request is received by the server. The recalculated values may be inserted into the replication data stream. The cached values may be invalidated and updated when, for example, a new transactions per second value is calculated.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
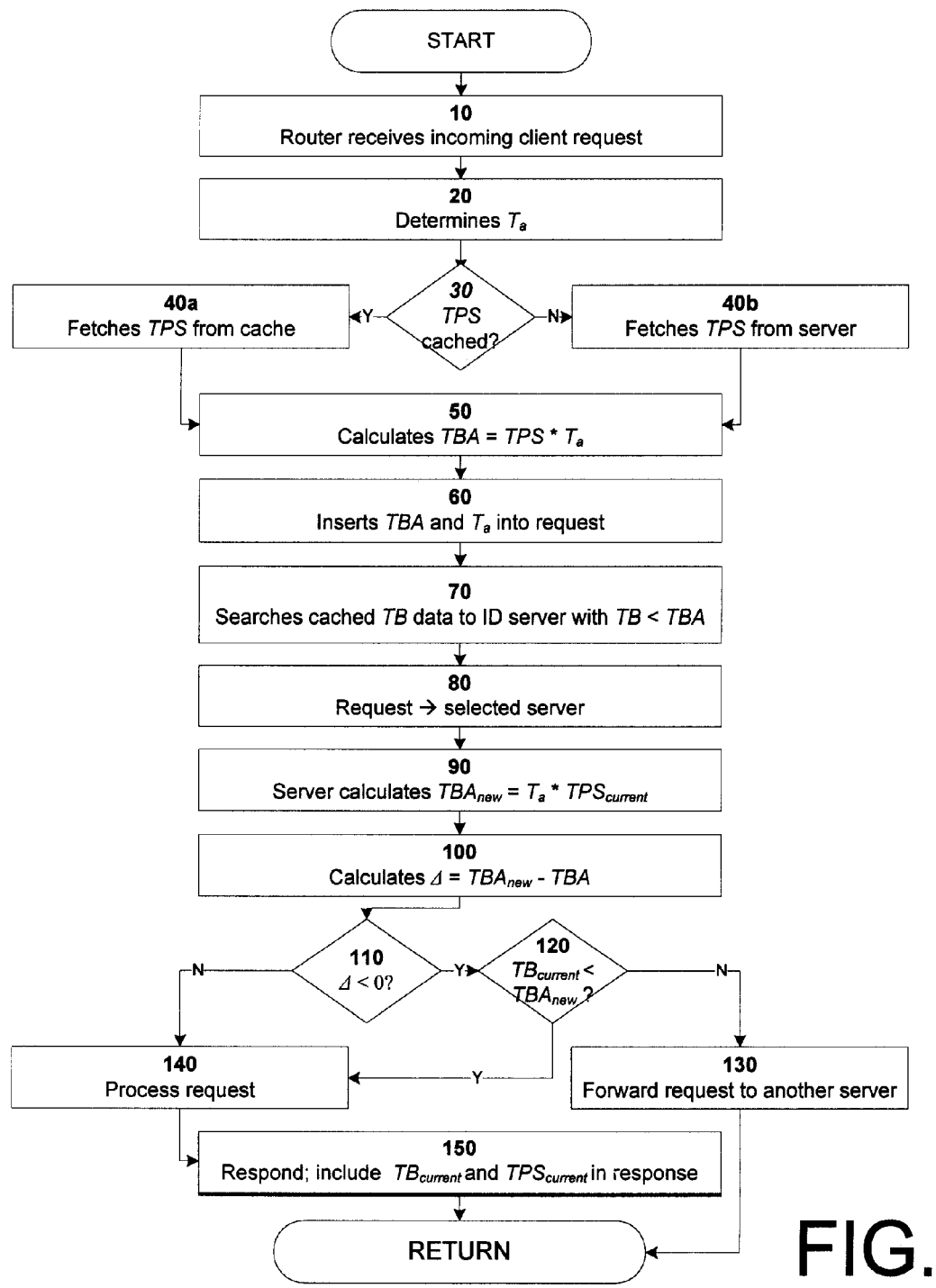
FIG. 1 illustrates a flow chart according to the preferred method.

The detailed description explains the preferred embodiments of the invention, together with advantages and features, by way of example with reference to the drawings.

DETAILED DESCRIPTION OF THE INVENTION

The flowchart of FIG. 1 illustrates one embodiment of how a common client that uses time delay as a metric for replication data quality may communicate with a server that uses the number of transactions behind as a metric for replication data quality and obtain useful replication data quality information. Data reflecting the number of transactions the server is behind, which may be referred to as transaction lag TB, and number of transactions the server processes each second, which may be referred to as the transaction processing rate TPS, may be used to dynamically calculate what transaction lag corresponds to a maximum allowable time delay $T_a$. Because transaction lag TB and transaction processing rate TPS both change constantly, this information may be updated each time the client makes a request to avoid stale data.

Referring to FIG. 1, 10 a router may receive a client request. The router may then 20 determine the maximum time delay that the client that made the request will allow, which may be referred to as the maximum allowable time delay $T_a$. If the request context includes explicit information regarding $T_a$, the router may extract this information from the request context. If the request context does not include such information, the router may determine $T_a$ by determining the class of the client from the request context and using that class information to look up the maximum allowable time delay for that class of clients. The router may use a map table that provides the maximum allowable delays for various client classes to look up the maximum allowable delay for that class of clients.

The router may then 30 check its cache to see if the transaction processing rate TPS for this class of clients is available locally. If a member of this class has previously made a request, the cache may contain the TPS. Similarly, if the client has previously made a request, cache at the client may contain the TPS. If the client request is the first request by a member of the client's class, 40b the transaction processing rate TPS is fetched from the server and cached. Otherwise, 40a the TPS is fetched from the cache.

Next, 50 the router may convert the maximum allowable time delay $T_a$ into the maximum allowable transaction lag TBA by multiplying $T_a$ by the transaction processing rate TPS:

$$TBA = T_a * TPS$$

The router may then 60 insert TBA and $T_a$ into the client request stream context. The router may then 70 search its cache to identify a server that with a cached transaction lag TB that is less than the maximum allowable transaction lag TBA and is therefore capable of handling the request. The router may then 80 route the request to the identified server.

The server, which has current transaction processing rate information $TPS_{current}$, may then 90 calculate a new value for a maximum allowable transaction lag $TBA_{new}$ using $TPS_{current}$ and the maximum allowable time delay $T_a$ extracted from the request context:

$$TBAnew = T_a * TPS_{current}$$

The server may then 100 determine the difference $\Delta$ between the client-calculated maximum allowable transaction lag TBA and the server-calculated maximum allowable transaction lag $TBA_{new}$:

$$\Delta = TBA_{new} - TBA$$

If 110 the difference $\Delta$ is positive, the server's current transaction processing rate $TPS_{current}$ is greater than the transaction processing rate TPS cached at the router or client. If the difference $\Delta$ is negative, however, the server's current transaction processing rate $TPS_{current}$ is less than the cached transaction processing rate TPS.

If $TPS_{current}$ is less than the cached transaction processing rate TPS, the server may 120 check to determine whether the current transaction lag $TB_{current}$ is less than the server-calculated maximum allowable transaction lag $TBA_{new}$ and the server therefore remains capable of handling the request. If $TB_{current}$ is greater than the server-calculated maximum allowable transaction lag $TBA_{new}$, the server 130 forwards the request to another server. Otherwise, the server 140 processes the request. The server 150 inserts the current transaction processing rate $TPS_{current}$ and the current transaction lag $TB_{current}$ into its response to the request. The router and the client may extract and cache $TPS_{current}$ and $TB_{current}$ for use with future requests. The response may be routed to users of the data.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for addressing discrepancies between client replication data quality information and server replication data quality information comprising the steps of:

calculating a maximum allowable transaction lag;

identifying one or more servers having a historical transaction lag less than said maximum allowable transaction lag;

sending a request to at least one of the identified one more or servers;

calculating, in at least one of the identified one more or servers, a modified maximum allowable transaction lag;

determining whether a current transaction lag is less than said modified maximum allowable transaction lag;

processing the request in the server; and responding to the request, said response including the current transaction lag.

* * * * *